US012768503B2

(12) United States Patent
Agueda et al.

(10) Patent No.: US 12,768,503 B2
(45) Date of Patent: Oct. 20, 2026

(54) DEVICE AND METHOD FOR FILLING AN ENCLOSURE WITH A PRESSURIZED FLUID AND THEN FOR EMPTYING THIS ENCLOSURE, WITH RECOVERY OF THE FLUID

(71) Applicant: FIVES FILLING & SEALING, Le Bignon (FR)

(72) Inventors: Sylvain Agueda, Le Bignon (FR); Sébastien Lavat, Le Bignon (FR)

(73) Assignee: FIVES FILLING & SEALING (FR)

(*) Notice: Subject to any disclaimer, the term of this patent is extended or adjusted under 35 U.S.C. 154(b) by 145 days.

(21) Appl. No.: 18/723,247

(22) PCT Filed: Dec. 22, 2022

(86) PCT No.: PCT/EP2022/087625
§ 371 (c)(1),
(2) Date: Jan. 10, 2025

(87) PCT Pub. No.: WO2023/118513
PCT Pub. Date: Jun. 29, 2023

(65) Prior Publication Data
US 2025/0137590 A1 May 1, 2025

(30) Foreign Application Priority Data
Dec. 24, 2021 (FR) ...................................... 2114512

(51) Int. Cl.
*F17C 13/02* (2006.01)

(52) U.S. Cl.
CPC ........ *F17C 13/02* (2013.01); *F17C 2201/054* (2013.01); *F17C 2205/0142* (2013.01);
(Continued)

(58) Field of Classification Search
CPC .......... F17C 5/06; F17C 13/02; F17C 13/025; F17C 2201/054; F17C 2205/0142;
(Continued)

(56) References Cited

U.S. PATENT DOCUMENTS 3,416,359 A * 12/1968 Durbin ............... G01R 31/2601 73/49.3
3,577,769 A * 5/1971 Roberts ................. G01M 3/229 73/40.7

(Continued)

FOREIGN PATENT DOCUMENTS

CN 104075106 B 10/2014
EP 0498434 B1 2/1996
IL 103883 A * 7/1995 ............... G01N 3/12

OTHER PUBLICATIONS

International Search Report of PCT/EP2022/087625, Issued Jun. 29, 2023.

*Primary Examiner* — Nicolas A Arnett
(74) *Attorney, Agent, or Firm* — The Belles Group, P.C.

(57) ABSTRACT

The invention relates to a method for filling an enclosure with a fluid until a target pressure is reached and then emptying the enclosure in due course, characterized in that the filling is performed from a first plurality of reservoirs at different pressures, successively starting with the reservoir at the lowest pressure and ending with the reservoir at the highest pressure, and in that the emptying is performed by transferring the contents of the enclosure into a second plurality of reservoirs, successively starting with the reservoir at the highest pressure and ending with the reservoir at the lowest pressure.

5 Claims, 1 Drawing Sheet

(52) U.S. Cl.
CPC .................... *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/043* (2013.01); *F17C 2227/044* (2013.01); *F17C 2260/038* (2013.01); *F17C 2265/025* (2013.01)

(58) Field of Classification Search
CPC ........ F17C 2205/0146; F17C 2221/012; F17C 2221/014; F17C 2221/017; F17C 2221/037; F17C 2223/0123; F17C 2223/035; F17C 2223/036; F17C 2225/0123; F17C 2225/035; F17C 2225/036; F17C 2227/0157; F17C 2227/043; F17C 2227/044; F17C 2250/01; F17C 2250/043; F17C 2250/0452; F17C 2250/0636; F17C 2250/0647; F17C 2260/038; F17C 2265/025
See application file for complete search history.

(56) References Cited

U.S. PATENT DOCUMENTS

| | | | | | |
|---|---|---|---|---|---|
| 4,984,450 | A * | 1/1991 | Burger | G01M 3/202 73/40.7 |
| 5,390,533 | A * | 2/1995 | Schulte | B01D 53/229 73/40 |
| 6,119,507 | A * | 9/2000 | Flosbach | G01M 3/205 73/40.7 |
| 6,530,264 | B1 * | 3/2003 | Rink | G01M 3/227 73/40.7 |
| 6,851,316 | B2 * | 2/2005 | Micke | G01M 3/02 73/40 |
| 7,752,892 | B2 * | 7/2010 | Muller | G01M 3/229 73/49.2 |
| 10,816,433 | B2 * | 10/2020 | Kawano | G01M 3/3209 |
| 11,719,591 | B2 * | 8/2023 | Regef | G01M 3/3272 73/40 |
| 2013/0056111 | A1 * | 3/2013 | White | F17C 5/02 141/11 |
| 2016/0116364 | A1 * | 4/2016 | Vaccaro | G01M 3/229 73/40.7 |

* cited by examiner

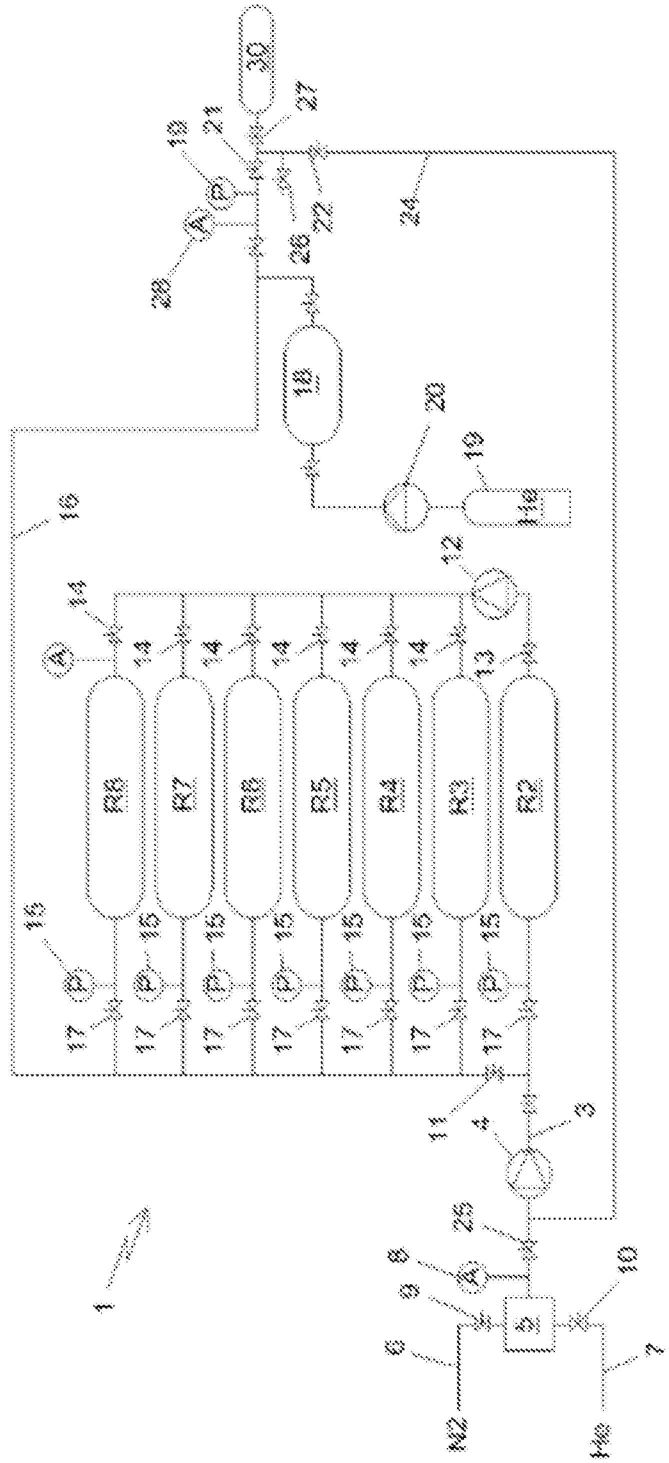
30
18
R2
R3
R4
R5
R6
R7
R8
N2
He

DEVICE AND METHOD FOR FILLING AN ENCLOSURE WITH A PRESSURIZED FLUID AND THEN FOR EMPTYING THIS ENCLOSURE, WITH RECOVERY OF THE FLUID

DESIGNATION OF THE TECHNICAL FIELD CONCERNED

The invention relates to methods requiring temporary filling of an enclosure with a pressurized fluid for which it is necessary to recover all or part of the fluid after emptying the enclosure. For example, the fluid may be recovered because it is dangerous, polluting or expensive.

The enclosure may be of any type, for example it may be a hydrogen storage reservoir for an electric vehicle. The method may also be of any nature, for example a method for testing the gas tightness of said hydrogen storage reservoir.

The invention applies to any type of fluid, whether liquid, gaseous or composed of a mixture of a gas and a liquid.

It is described below for the particular case of a method for testing the gas tightness of a hydrogen reservoir using a tracer gas, without this limiting the field of application of the invention.

Technical Problems Addressed by the Invention

The tightness test of a hydrogen reservoir with a tracer gas consists of filling it with the tracer gas, for example a mixture of nitrogen and helium with 2% helium under a pressure of 600 bars. The tightness of the reservoir is then checked with a sensor which detects the presence of helium in the vicinity of the reservoir in the event of a leak.

According to the prior art, filling may be performed from a first reservoir, whose tracer gas pressure is higher than that desired in the reservoir to be tested, and whose volume is sufficient for this pressure to remain higher than that of the reservoir to be tested when the latter has reached the target pressure. During the emptying, the gas is transferred from the reservoir to be tested into a second reservoir. A compressor then returns the tracer gas from the second reservoir to the first reservoir and a top-up of tracer gas is made in the first reservoir.

This solution is not energy efficient because it requires a significant increase in pressure of the tracer gas. It also leads to an important formation of frost around the valves and pipes due to the substantial expansion of the tracer gas during the filling and emptying of the reservoir to be tested.

The invention provides a new solution to these problems.

SUMMARY OF THE INVENTION

According to a first aspect of the invention, a method is proposed for filling an enclosure with a fluid until a target pressure is reached and then emptying said enclosure in due course, characterized in that the filling is performed from a first plurality of reservoirs at different pressures, successively starting with the lowest pressure reservoir and ending with the highest pressure reservoir, and in that the emptying is performed by transferring the contents of the enclosure into a second plurality of reservoirs, successively starting with the highest pressure reservoir and ending with the lowest pressure reservoir.

The invention makes it possible to limit fluid consumption by recovering a large part of it and reusing it again for a new filling cycle. It also makes it possible to optimize the filling method energetically, the fluid being recovered pressurized, thus limiting the energy required to raise its pressure to the desired level when the filling is completed.

After the emptying, the fluid may be topped up in the second plurality of reservoirs, which is then used as the first plurality of reservoirs for filling another enclosure.

Advantageously, the emptying is performed in a second plurality of reservoirs composed of reservoirs of the first plurality of reservoirs. Carrying out the emptying in the same plurality of reservoirs makes it possible to limit the number of reservoirs, thus reducing the cost of the machine and its size.

According to a second aspect of the invention, a machine is proposed for filling an enclosure with a fluid until a target pressure is reached and then emptying said enclosure in due course, comprising a first plurality of reservoirs at different pressures from which the filling of the enclosure is performed, and a second plurality of reservoirs into which the fluid is transferred from the enclosure during the emptying, said machine being suitable for implementing the method according to the first aspect of the invention.

Preferably, the second plurality of reservoirs is composed of reservoirs of the first plurality of reservoirs.

BRIEF DESCRIPTION OF THE FIGURES

Other characteristics and advantages of the invention will appear while reading the detailed description which follows, and which will refer to the appended drawing for further understanding.

FIG. 1 is a schematic view of a machine according to an exemplary embodiment of the invention.

The hydrogen reservoir to be tested 30 is first subjected to a pressure resistance test under water. It is then dried and then flushed with nitrogen to remove any traces of oxygen in the reservoir. At the end of this operation, it is under a residual pressure of approximately 5 bars of nitrogen.

It is then filled with tracer gas until the desired pressure is reached. It is maintained at this pressure while the gas tightness test is performed. Finally, once tested, the reservoir is emptied. The filling and emptying of the reservoir are performed by implementing the method according to the invention and by means of a machine according to the invention.

The machine 1 shown in [FIG. 1] comprises a first reservoir R2 supplied with a mixture of nitrogen and helium with 2% helium under a pressure of 40 bars from a supply circuit 3 comprising a pump 4 and a mixer 5 supplied by a nitrogen circuit 6 and a helium circuit 7. The helium content at the outlet of the mixer is measured by an analyzer 8 and the proportions of nitrogen and helium are adjusted with regulation valves 9, 10.

The valve 11 is closed during the filling phase of the reservoir R2, as well as the valve 13 located at the outlet of the reservoir.

The machine 1 comprises a set of complementary reservoirs, six reservoirs R3 to R8 in this embodiment, intended to receive the tracer gas at different and higher pressures.

A compressor 12 makes it possible to supply these reservoirs with tracer gas from that available in the reservoir R2 by raising its pressure from 40 bars to 718 bars. The reservoirs R3 to R8 are supplied with gas by opening an inlet valve 14 connected to an outlet of the compressor 12, the inlet valve 14 being closed when the target pressure is reached in the reservoir, the pressure of the reservoir being measured by a pressure gauge 15.

For example, the last reservoir R8 is at a nominal pressure of 718 bars, higher than that of 600 bars of the reservoir to be tested 30, the others are at decreasing intermediate nominal pressures, up to 40 bars for the reservoir R2.

To fill the reservoir to be tested 30 with tracer gas at 600 bars, it is successively connected to each of the reservoirs R3 to R8 using a transfer circuit 16 connected to the outlets of the reservoirs R3 to R8, by opening an outlet valve 17 of the reservoir concerned, starting with the reservoir R3 at the lowest pressure. Once a desired pressure is reached in the reservoir to be tested 30, the valve 17 of the reservoir concerned is closed and that of the next reservoir is opened in order to increase the pressure in the reservoir to be tested. When arriving at the last reservoir R8 at 718 bars, its outlet valve 17 is opened until the pressure in the reservoir to be tested 30 is 600 bars. Once this pressure is reached, the reservoir R8 is isolated by closing its outlet valve 17.

The helium content in the reservoir to be tested is checked with an analyzer 28 and helium is topped up, if necessary, from a helium buffer reservoir 18 at 750 bars. The buffer reservoir 18 is supplied with helium from a helium supply reservoir 19 by means of a booster 20.

Once the tightness test is completed, the outlet valve 17 of the reservoir R7 is opened in order to connect it to the reservoir to be tested by means of the transfer circuit 16. Due to a higher pressure in the reservoir to be tested 30, part of the tracer gas which was in this reservoir is transferred to reservoir R7. It is possible to wait until the pressures between the reservoir to be tested 30 and the reservoir R7 are balanced, but this may take too long which penalizes the cycle time of the machine. It is thus advantageous to stop the transfer between the two reservoirs when the pressure difference between them has reached a target value. The reservoir R7 is then isolated by closing its outlet valve 17 and the reservoir to be tested 30 is connected to the reservoir R6 by means of the transfer circuit 16 by opening its outlet valve 17. Once the target pressure difference is reached between these two reservoirs, the reservoir R6 is isolated by closing its outlet valve 17 and the same process is used for the reservoirs R5 to R2 so as to successively transfer the tracer gas contained in the reservoir to be tested 30 into these reservoirs.

In order to limit the loss of tracer gas and further improve the energy efficiency of the machine, the machine 1 may include a return circuit 24 connecting the reservoir to be tested 30 and the suction element of the pump 4, making it possible to transfer the remaining tracer gas in the reservoir 30 to the reservoir R2. A valve 22 is arranged on the side of the machine to be tested 30 in order to isolate the return circuit 24. During this step, the mixer 5 is isolated by a valve 25. At the end of this operation, after closing the valve 22, a valve 26 makes it possible to bring the reservoir 30 back to atmospheric pressure before it is separated from the machine.

Alternatively, the machine may not include the return circuit 24 and the opening of the valve 22 may simply discharge to the atmosphere the remainder of the tester gas contained in the tested reservoir and return its pressure to atmospheric pressure.

Subsequently, pressure is added to the reservoirs R3 to R8 with the compressor 12 to bring them back to their nominal pressure and a new reservoir to be tested 30 is connected to the machine before starting a second test cycle. A top-up of tracer gas is also made in the reservoir R2 when its pressure gauge 15 detects that its pressure has reached a low threshold.

The table below illustrates an example of operating points of a machine according to [FIG. 1], in which column A contains the nominal pressures of the reservoirs at the start of the test cycle of a reservoir to be tested 30, column B contains the pressures of the reservoirs after filling the reservoir to be tested 30, column C contains the volume supplied to the reservoir to be tested 30 by each reservoir, column D contains the pressures of the reservoirs after the recovery of gas from the tested reservoir, column E contains the volumsted reservoir 30 by each reservoir, and column F contains the volume of gas to be supplied to the reservoirs to return to the initial state and start a new test cycle.

| Reservoirs | Volume (liters) | A (Bars) | B (Bars) | C(Nm3) | D (Bars) | E ($Nm^3$) | F ($Nm^3$) |
|---|---|---|---|---|---|---|---|
| R8 | 300 | 718 | 621 | 29.0 | 621 | — | 29.0 |
| R7 | 300 | 600 | 500 | 24.0 | 554 | 13.3 | 16.7 |
| R6 | 300 | 500 | 400 | 24.0 | 464 | 19.3 | 10.7 |
| R5 | 300 | 400 | 300 | 24.0 | 373 | 21.9 | 8.1 |
| R4 | 300 | 300 | 200 | 20.9 | 277 | 23.1 | 6.9 |
| R3 | 300 | 200 | 113 | 20.9 | 186 | 21.9 | 4.2 |
| R2 | 1000 | 40 | 40 | — | 68 | 28.2 | — |
| 30 | 240 | 5 | 600 | — | 68 | — | — |

The reservoir to be tested 30 was filled from the reservoirs R3 to R8 with a total volume of tracer gas of 142.8 $Nm^3$. After the test was completed, 127.7 $Nm^3$ of tracer gas was recovered from the reservoir to be tested 30, or 89% of the tracer gas. A top-up of 75.6 $Nm^3$ of tracer gas was necessary in the reservoirs R3 to R8 from the reservoir R2, but only 47.4 $Nm^3$ was supplied by the mixing station 5, the difference having been recovered in the reservoir R2 when emptying the tested reservoir. Only 16.4 $Nm^3$ would be lost if the reservoir were to be connected to the atmosphere by opening the valve 26, corresponding to the 68 bars remaining in the reservoir tested after the emptying. However, it is advantageous to recover this gas via the return circuit 24.

Several models of reservoirs 30 may be tested on the machine, with varying test volumes and/or pressures. When changing to a new reservoir model to be tested, the pressure levels in the reservoirs R3 through R8 may be adjusted according to the test pressure of the new reservoir.

Advantageously, for the test of the first reservoir of a new model, depending on the pressure required for its test, its filling with tracer gas may follow a strategy defined according to the pressures available in the reservoirs R3 to R8. Thus, if the test pressure is low, for example 400 bars, only the first reservoirs R3 to R6 will be used and the gas top-up for these reservoirs after the test may be performed from the reservoir R7. The same will be done for the following tests as long as the pressure in the reservoir R7 allows it. When it becomes insufficient, the reservoirs R3 to R6 will be topped up from reservoir R8. As and when the reservoirs R7 and R8 have insufficient pressure for top-up, they integrate the batch of reservoirs used for filling the reservoir to be tested. The pressure distribution in these reservoirs is adjusted each time a new reservoir joins the batch of reservoirs used for filling in order to optimize the energy efficiency of the test method.

The number of the reservoirs R2 to R8 is optimized in particular according to the test pressure of the reservoir, according to the variety of reservoirs to be tested in terms of test pressure and volume and according to the cycle time required for testing a reservoir. Pressure losses in the circuits and the Kv values of the valves are also taken into account, said valves having an impact on the tracer gas flows. Kv expresses the flow rate in a valve with a pressure drop of one bar; if it is a control valve, the Kv value will be different depending on the opening level of the valve. Hydrogen reservoirs 30 are generally equipped with an "overflow" type valve 27. For safety reasons, this valve closes when the flow rate exceeds a defined value. The maximum flow rate authorized when emptying a tested reservoir is thus limited by this valve and must be taken into account when sizing the machine. Likewise, the volume of the reservoirs R2 to R8 is chosen according to these parameters, not all reservoirs necessarily having the same volume.

These choices are made after a digital simulation of the machine's operation in order to select the best compromise between the operating cost of the machine and its purchase cost. Indeed, adding a reservoir may be advantageous for the energy efficiency of the machine, but such a solution is not viable if the savings achieved on the operation of the machine do not compensate for the additional cost resulting from the additional reservoir.

The invention claimed is:

1. A method for filling an enclosure with a fluid until a target pressure is reached and then for emptying said enclosure in due course, characterized in that the filling is performed from a first plurality of reservoirs at different pressures, successively from a lowest pressure reservoir to a highest pressure reservoir, and in that the emptying is performed by transferring the contents of the enclosure into a second plurality of reservoirs, successively starting with the highest pressure reservoir and ending with the lowest pressure reservoir.

2. The method according to claim 1, characterized in that the emptying is performed into a second plurality of reservoirs composed of reservoirs of the first plurality of reservoirs.

3. The method according to claim 2, characterized in that after the emptying, fluid is added to the second plurality of reservoirs, which is then used as the first plurality of reservoirs for filling another enclosure.

4. A method, comprising:

supplying an enclosure with a fluid until a target pressure of the fluid in the enclosure is reached, wherein the supplying is performed from a first plurality of reservoirs at different pressures successively from a lowest pressure reservoir to a highest pressure reservoir; and then discharging the enclosure, wherein the discharging is performed by transferring fluid from the enclosure into a second plurality of reservoirs successively starting with a highest pressure reservoir and ending with a lowest pressure reservoir, wherein the second plurality of reservoirs is at least partially composed of reservoirs of the first plurality of reservoirs.

5. A method, comprising:

supplying an enclosure with a fluid until a target pressure of the fluid in the enclosure is reached, wherein the supplying is performed from a first plurality of reservoirs at different pressures successively from a lowest pressure reservoir to a highest pressure reservoir; and then discharging the enclosure, wherein the discharging is performed by transferring fluid from the enclosure into a second plurality of reservoirs successively starting with a highest pressure reservoir and ending with a lowest pressure reservoir, wherein after the discharging, the second plurality of reservoirs is then used as a first plurality of reservoirs for supplying another enclosure.

* * * * *